M. W. DAY.
CONTROLLER FOR ELECTRIC CIRCUITS.
APPLICATION FILED JUNE 27, 1907.
908,397.  Patented Dec. 29, 1908.
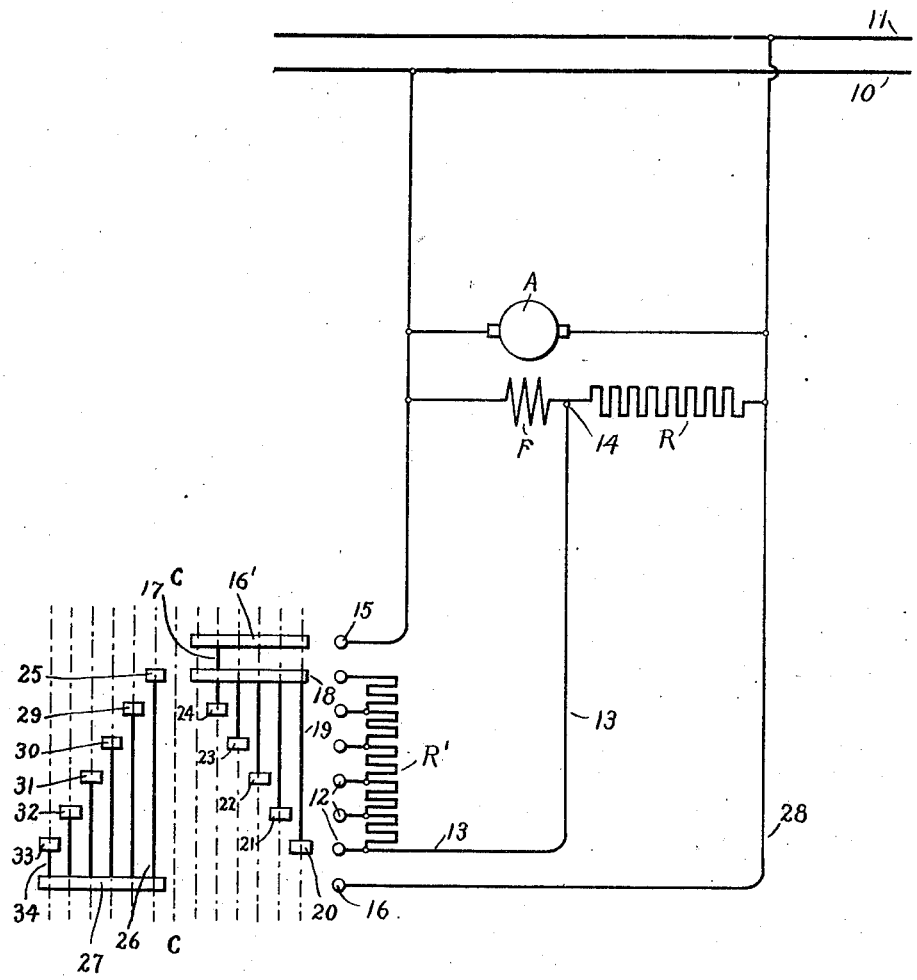
Witnesses
John E. Ryan
J. Ellis Glen
Inventor
Maxwell W. Day
by Albert G. Davis
Atty.

UNITED STATES PATENT OFFICE.

MAXWELL W. DAY, OF SCHENECTADY, NEW YORK, ASSIGNOR TO GENERAL ELECTRIC COMPANY, A CORPORATION OF NEW YORK.

CONTROLLER FOR ELECTRIC CIRCUITS.

No. 90,897.   Specification of Letters Patent.   Patented Dec. 29, 1908.

Application filed June 27, 1907. Serial No. 381,015.

*To all whom it may concern:*

Be it known that I, MAXWELL W. DAY, a citizen of the United States, residing at Schenectady, county of Schenectady, State of New York, have invented certain new and useful Improvements in Controllers for Electric Circuits, of which the following is a specification.

This invention relates to devices for controlling electric circuits and has for its object the provision of means whereby the circuit of a dynamo electric machine, such as a motor or generator, may be controlled throughout a wide range by fine gradations in a reliable and efficient manner.

My invention relates more specifically to devices for controlling generator fields, usually separately excited, one of the objects of my invention being to provide a system of control in which a very low voltage will be obtainable.

In carrying out my invention I provide two resistances, one of which is in series with the field and the other is in shunt with the field and arranged to be connected in shunt to the series resistance. The resistance in series with the field is, preferably, a non-variable or fixed resistance, while the other is varied by the operator. The arrangement is such that in starting the variable resistance is gradually connected in shunt to the generator field, being at first practically a short-circuit for it. This gives the very lowest voltage of the generator. The controlling member is then operated to gradually cut resistance in shunt to the field thereby increasing the field strength. When all the variable resistance is in the shunt circuit the shunt circuit is opened and only the fixed resistance is in series with the field. The next step of the controller places the variable resistance in shunt to the fixed resistance thereby further strengthening the field. By further movement of the controller this resistance is gradually cut out thereby also short-circuiting the fixed resistance and leaving the field of the generator directly across the line. By this arrangement I can obtain a range of voltage from minimum to maximum by a continuous movement of the controller.

In the accompanying drawing I have shown a specific embodiment of my invention. In the example here selected I have shown a shunt field which will commonly be employed but any mode of field excitation may be employed.

Referring to this drawing A is the armature and F the field of a shunt wound generator feeding the mains 10 and 11. A resistance R is permanently in series with the field of the generator. A variable resistance R' provided with contacts 12 has one end connected by a conductor 13 with a point 14 between the field and the fixed resistance. A controlling member, preferably of the drum type, coöperates with the contacts 12 to gradually vary the resistance and vary its relation to the field F and resistance R. Contacts 15 and 16 are each connected to one terminal of the field F and fixed resistance R respectively but are not connected with the variable resistance R'.

The arrangement of circuits and the mode of operation are as follows:—When the controller is turned to the first step the field F will be short-circuited as follows: from one shunt field terminal to point 15 to segment 16' of the controller and conductor 17 to segment 18, conductor 19, segment 20 to the first contact 12 thence through conductor 13 to point 14. This will give the very lowest voltage of the generator. As the controller is turned so that the contacts 12 successively engage the segments 21, 22, 23 and 24 respectively, sections of the resistance R' will be gradually cut in shunt to the field F until the segment 18 passes off the last contact 12. This will be the central position of the controller represented by the dotted line *c c*. This opens the shunt circuit around the field F and leaves the resistance R the only resistance in the field circuit. The next step throws the segment 25 on to the last of the contacts 12. This places the resistance R and the resistance R' in parallel with each other and in series with the field. The circuit of the resistance R' will be from point 14 through the resistance R' to segment 25 thence through conductor 26 and segment 27 to contact 16 and conductor 28. By a continuous movement of the controller the contacts 12 will successively engage the segments 29, 30, 31, 32 and 33 respectively and gradually cut the resistance R' out of the shunt circuit until the segment 33 passes on to the first contact 12. The resistance R is then short-circuited as follows: from the point 14 and conductor 13 to segment 33 and conductor 34, segment 27, contact 16 and conductor 28. Both resistances now being short-circuited the field is directly across the line and the generator will deliver the highest voltage.

It will be seen that I have provided a very simple means whereby the voltage of the generator may be controlled with two resistances and a single controller. The controller is moved continuously in one direction and a wide range may be obtained with a very fine degree of regulation.

While I have described my invention as being used to regulate the voltage of a generator, it will be understood, of course, that I do not limit my invention to this particular use except in so far as it is limited by the scope of the claims annexed hereto.

What I claim as new and desire to secure by Letter Patent of the United States, is,

1. The combination with a generator, of a fixed resistance in series with the field thereof, and a variable resistance arranged to be connected in shunt either to the field or to said fixed resistance.

2. The combination with a generator, of a fixed resistance in series with the field thereof, a variable resistance, and controlling means whereby said variable resistance is first connected in shunt to the field and then in shunt to the fixed resistance.

3. The combination with a generator, of a fixed resistance in series with the field thereof, and a variable resistance provided with a controlling member arranged to connect it in shunt either to the field or to said fixed resistance and gradually vary it by a continuous movement.

4. The combination with a dynamo-electric machine, of a fixed resistance in series with the field thereof, and a variable resistance arranged to be gradually connected in shunt to the field then connected in shunt to the fixed resistance and gradually cut out.

5. Means for controlling an electric circuit comprising a fixed resistance, a variable resistance, and a controlling device arranged to connect the variable resistance in series and in shunt successively to the fixed resistance and gradually vary the same.

6. The combination with a dynamo-electric machine, of a fixed resistance in series with the field thereof, a variable resistance having one end connected between the field and the resistance and arranged to be connected in shunt to either and gradually varied.

7. The combination with a dynamo-electric machine, of a fixed resistance in series with the field thereof, a variable resistance provided with contacts and adapted to be connected in shunt to the field and the fixed resistance respectively, and a controlling member coöperating with said contacts and arranged to gradually vary the resistance in shunt to the field and then in shunt to the fixed resistance by a continuous movement.

8. The combination with a dynamo electric machine, of a fixed resistance in series with the field thereof, a variable resistance provided with contacts and having one end connected between the field and the fixed resistance, and a controlling member coöperating with said contacts and arranged to connect said variable resistance in shunt to either the field or the fixed resistance and gradually vary it by a continuous movement.

9. The combination with a generator, of a fixed resistance in series with the field thereof, a variable resistance provided with contacts having one end connected between the field and the fixed resistance, and a controlling member coöperating with said contacts and arranged to first gradually connect said variable resistance in shunt to the field then connect it in shunt to the fixed resistance and gradually cut it out by a continuous movement finally short circuiting the said fixed resistance.

In witness whereof I have hereunto set my hand this 22 day of June, 1907.

MAXWELL W. DAY.

Witnesses:
BENJAMIN B. HULL,
HELEN ORFORD.